(12) United States Patent
Lin et al.

(10) Patent No.: US 9,448,644 B2
(45) Date of Patent: Sep. 20, 2016

(54) TOUCH CONTROL SYSTEM

(71) Applicant: Quanta Computer Inc., Kuei Shan Hsiang, Tao Yuan Shien (TW)

(72) Inventors: Chien-Hung Lin, Tao Yuan Shien (TW); Tao-Feng Chen, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 162 days.

(21) Appl. No.: 14/287,694

(22) Filed: May 27, 2014

(65) Prior Publication Data

US 2015/0261382 A1 Sep. 17, 2015

(30) Foreign Application Priority Data

Mar. 11, 2014 (TW) .............................. 103108319 A

(51) Int. Cl.
*G06F 3/0354* (2013.01)
*G06F 3/042* (2006.01)

(52) U.S. Cl.
CPC ......... *G06F 3/03545* (2013.01); *G06F 3/0428* (2013.01)

(58) Field of Classification Search
CPC ............................... G06F 3/042; G06F 3/0354
See application file for complete search history.

(56) References Cited

U.S. PATENT DOCUMENTS 7,136,052 B1 * 11/2006 Lam .................... G06F 3/03545
178/19.01
2004/0169439 A1 * 9/2004 Toda ..................... B06B 1/0655
310/328
2011/0242061 A1 * 10/2011 Liang ................. G06F 3/03545
345/179
2012/0313898 A1 12/2012 Chang et al.

FOREIGN PATENT DOCUMENTS

TW 201122925 7/2011
TW 201250551 12/2012

OTHER PUBLICATIONS

Chinese language office action dated Jul. 20, 2015, issued in application No. TW 103108319.

* cited by examiner

*Primary Examiner* — Sahlu Okebato
(74) *Attorney, Agent, or Firm* — McClure, Qualey & Rodack, LLP

(57) ABSTRACT

A touch control system is provided and connected to a display surface, including a stylus and at least two sensing devices. The stylus includes a housing, a first opening, a second opening, a contacting member, and a reflecting member. The housing has a first end and a second end opposite to the first end. The first opening is formed at the first end. The second opening is formed between the first end and the second end. The contacting member protrudes from the first opening. The reflecting member is disposed in the housing, situated between the first opening and the second opening, and connected to the contacting member. When the contacting member contacts the display surface and moves along a direction from the first opening toward the second opening, the reflecting member is exposed to the second opening and reflects a light signal emitted from the sensing devices.

8 Claims, 12 Drawing Sheets

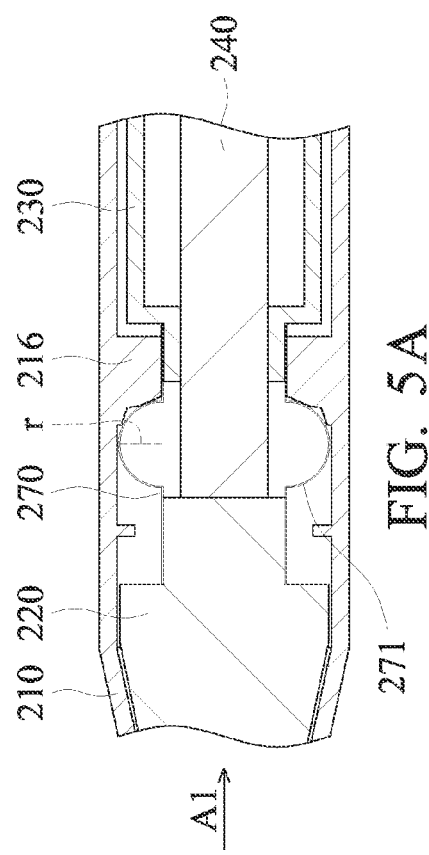
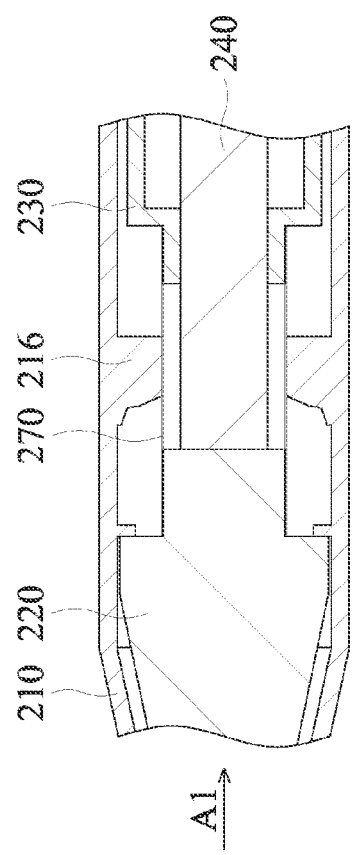
FIG. 5A
FIG. 5B

TOUCH CONTROL SYSTEM

CROSS REFERENCE TO RELATED APPLICATIONS

The present application is based on, and claims priority from, Taiwan Patent Application No. 103108319, filed on Mar. 11, 2014, the disclosure of which is hereby incorporated by reference herein in its entirety.

BACKGROUND OF THE INVENTION

1. Field of the Invention

The application relates in general to a touch control system, and in particular, to a touch control system adapted to a display device or a flat surface.

2. Description of the Related Art

In recent years, many electronic products with touch-control functionality have been manufactured, allowing users to directly touch or press on a screen with a finger to operate the electronic products. Generally, a touch panel is provided in a touch control electronic product, wherein the touch panel includes at least a substrate and a plurality of electrode layers. Therefore, these electronic products usually have considerable thickness, and miniaturization thereof has become a critical issue.

BRIEF SUMMARY OF INVENTION

To address the deficiency of conventional electronic products, an embodiment of the invention provides a touch control system connected to a display surface, including a stylus and at least two sensing devices. The stylus includes a housing, a first opening, a second opening, a contacting member, and a reflecting member. The housing has a first end and a second end opposite to the first end. The first opening is formed at the first end. The second opening is formed between the first end and the second end. The contacting member protrudes from the first opening. The reflecting member is disposed in the housing, situated between the first opening and the second opening, and connected to the contacting member. When the contacting member contacts the display surface and moves along a direction from the first opening toward the second opening, the reflecting member is exposed to the second opening and reflects a light signal emitted from the sensing devices.

In some embodiments, the display surface is formed on a display device, and the sensing devices connect to the display device.

In some embodiments, the sensing devices electrically connect to a computer.

In some embodiments, the sensing devices are clamped on the corners of the display surface.

In some embodiments, the stylus further comprises an elastic member disposed between the second end of the housing and the reflecting member.

In some embodiments, the stylus further comprises a rod disposed between the reflecting member and the elastic member.

In some embodiments, the stylus further comprises a rod connected to the contacting member and disposed between the contacting member and the elastic member, and the reflecting member surrounds the rod.

In some embodiments, the stylus further comprises a flexible member disposed between the contacting member and the reflecting member, the flexible member comprises a wrinkle portion and the housing comprises a protrusion. When the contacting member contacts the display surface and moves along a direction from the first opening toward the second opening, the protrusion flattens the wrinkle portion along a direction toward the interior of the housing.

In some embodiments, the stylus further comprises a receiving member, a fluid, a first piston, and a second piston. The receiving member is disposed between the contacting member and the reflecting member. The fluid is disposed in the receiving member. The first piston connects the contacting member with the fluid and is movably disposed in the receiving member. The second piston connects the reflecting member with the fluid and is movably disposed in the receiving member.

In some embodiments, the receiving member comprises a first portion and a second portion, the first portion is close to the contacting member and the second portion is close to the reflecting member, wherein the cross-sectional area of the first portion exceeds the cross-sectional area of the second portion.

BRIEF DESCRIPTION OF DRAWINGS

The invention can be more fully understood by reading the subsequent detailed description and examples with references made to the accompanying drawings, wherein:

FIG. 5A is a partial cross-sectional view of a stylus according to another embodiment of the invention;

FIG. 5B is a schematic diagram of a contacting member of the stylus in FIG. 5A which moves along a first direction;

DETAILED DESCRIPTION OF INVENTION

The making and using of the embodiments of the touch control system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 1:
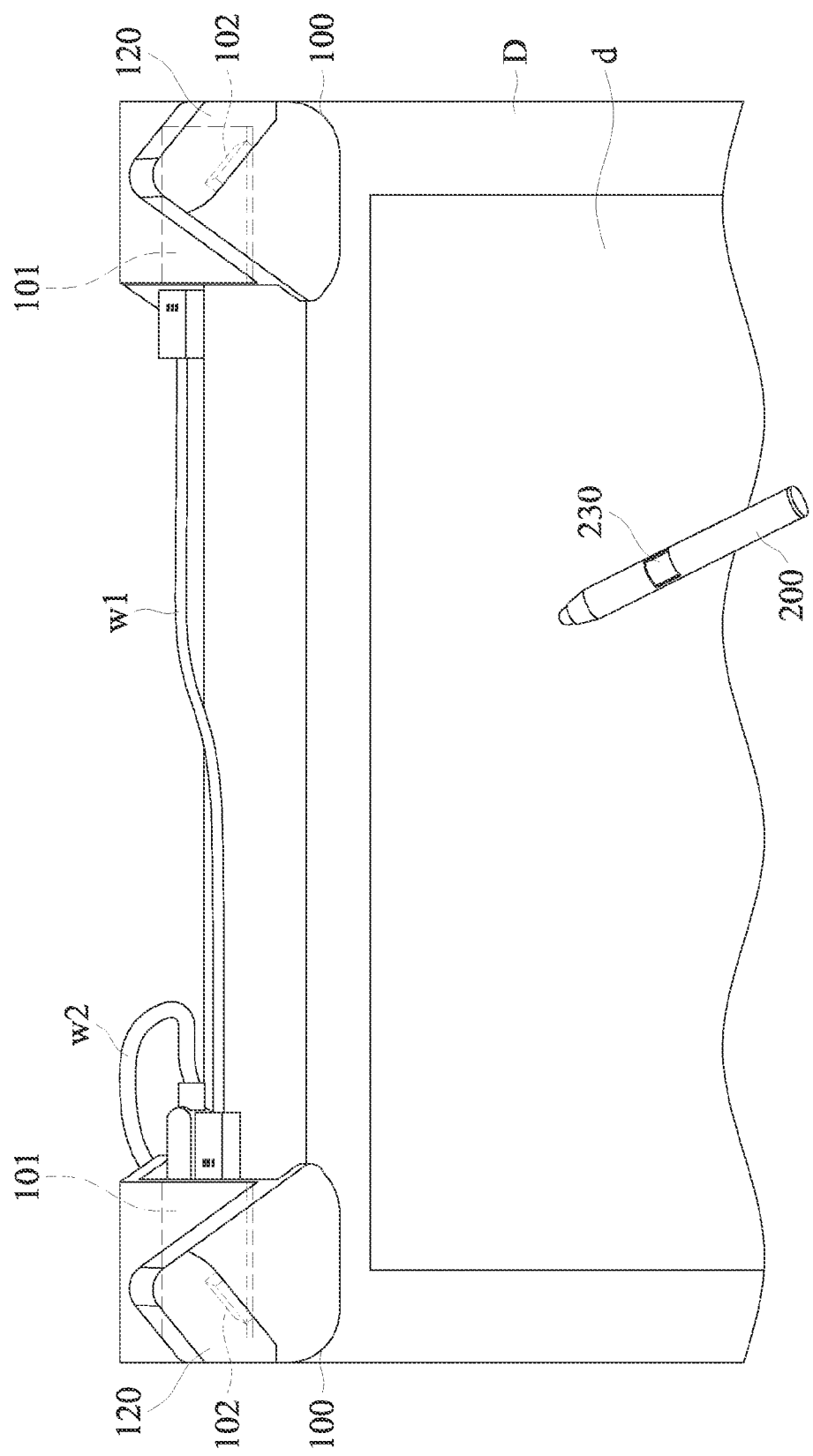
FIG. 1 is a schematic diagram of a touch control system mounted on a display device according to an embodiment of the invention.

FIG. 1 is a schematic diagram of a touch control system mounted on a display device D according to an embodiment of the invention. The touch control system comprises two sensing devices 100 and a stylus 200. In this embodiment, the sensing devices 100 are respectively disposed at the left and right corners of the display device D. The user can hold the stylus 200 to touch a display surface d of the display device D.

Figure 2:
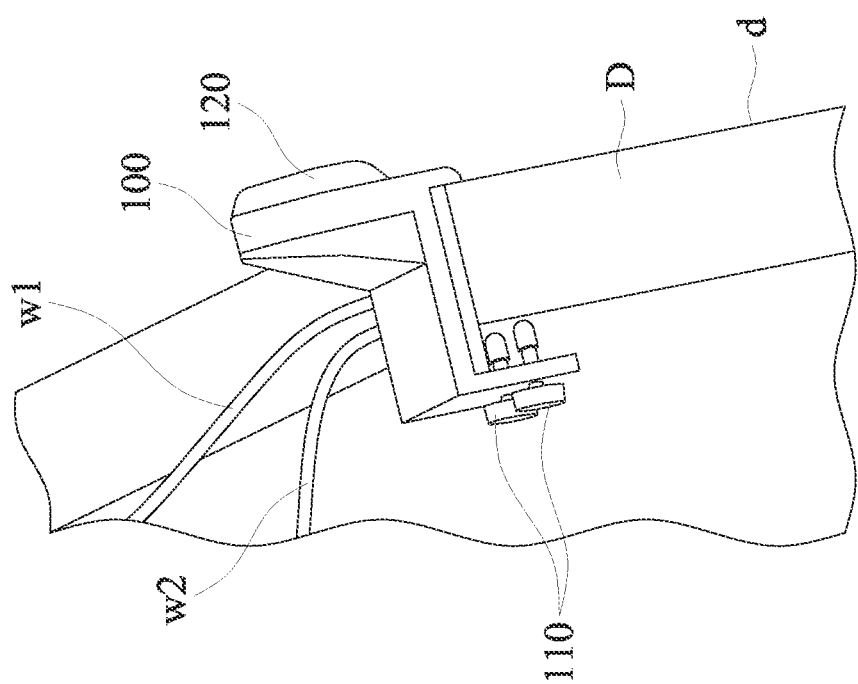
FIG. 2 is a schematic diagram of a sensing device clamped on a display device according to an embodiment of the invention.

As shown in FIGS. 1 and 2, the sensing devices 100 are clamped on the display device D by adjustable screws 110 in this embodiment. Two sensing devices 100 are electrically connected to each other by a wire w1. A substrate 101 and a sensor 102 electrically connected to the substrate 101 are disposed in the sensing device 100, wherein the sensor 102 is disposed in a protruding portion 120 of the sensing device 100. The sensor 102 can emit and receive a light signal (infrared, for example) to detect the position of the stylus 200. The protruding portion 120 is extended along a normal direction of the display surface d.

It should be noted that the display device D can be a smart TV or a non-smart TV. If the display device D is a smart TV, the substrate 101 of the sensing device 100 can be connected to the internal elements of the display device D by inserting a wire w2 into a socket (USB for example) of the display device D. If the display device D is a non-smart TV (a flat display of a personal computer or a laptop computer, for instance), the substrate 101 of the sensing device 100 can be electrically connected to the main body of the personal computer or laptop computer via a wire w2. In some embodiments, the sensing devices 100 can be mounted on a flat surface, such as the surface of a table or whiteboard. The wire w2 can be connected to a projector, and the projector can project an image onto the flat surface.

As shown in FIG. 1, when the user holds the stylus 200 to push against the display surface d of the display device D, a reflecting member 230 in the stylus 200 is visible through a window. A light signal emitted from the sensing device 100 can be reflected by the reflecting member 230 and received by the sensing device 100. The relative angle between the stylus 200 and the sensing device 100 can be determined. Furthermore, the position where the stylus 200 contacts the display surface d can be determined by applying two sensing devices 100. The sensing device 100 can transmit a position signal to the display device D, such as the smart TV, the main body of the computer, or the projector.

Figure 3A:
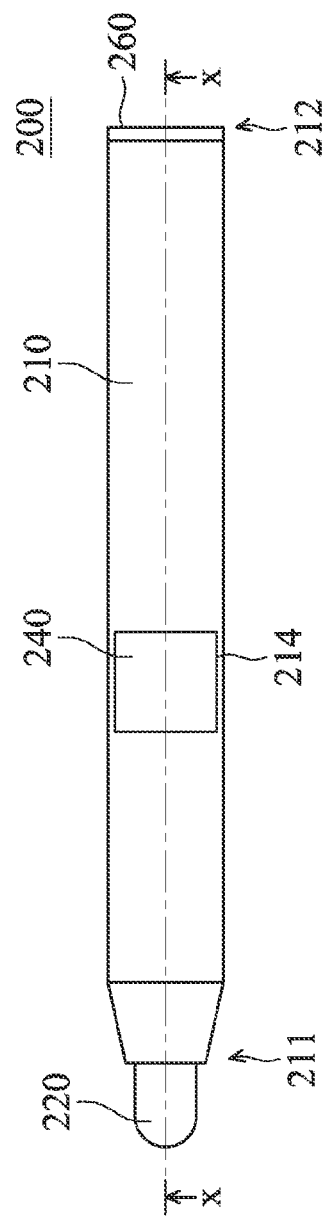
FIG. 3A is a schematic diagram of a stylus according to an embodiment of the invention.
Figure 3B:
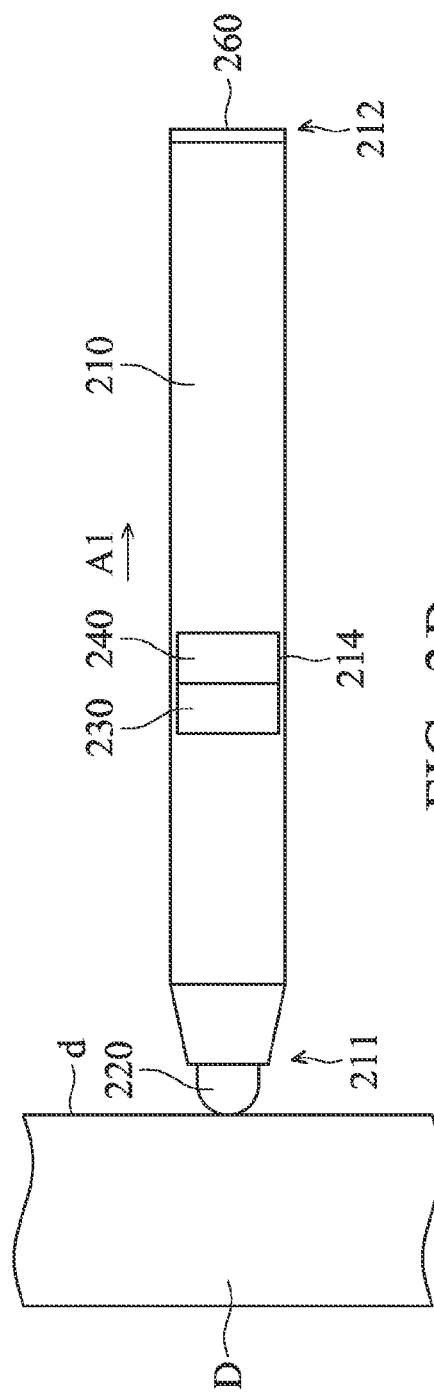
FIG. 3B is a schematic diagram of the stylus in FIG. 3A contacting a display surface according to an embodiment of the invention.
Figure 3C:
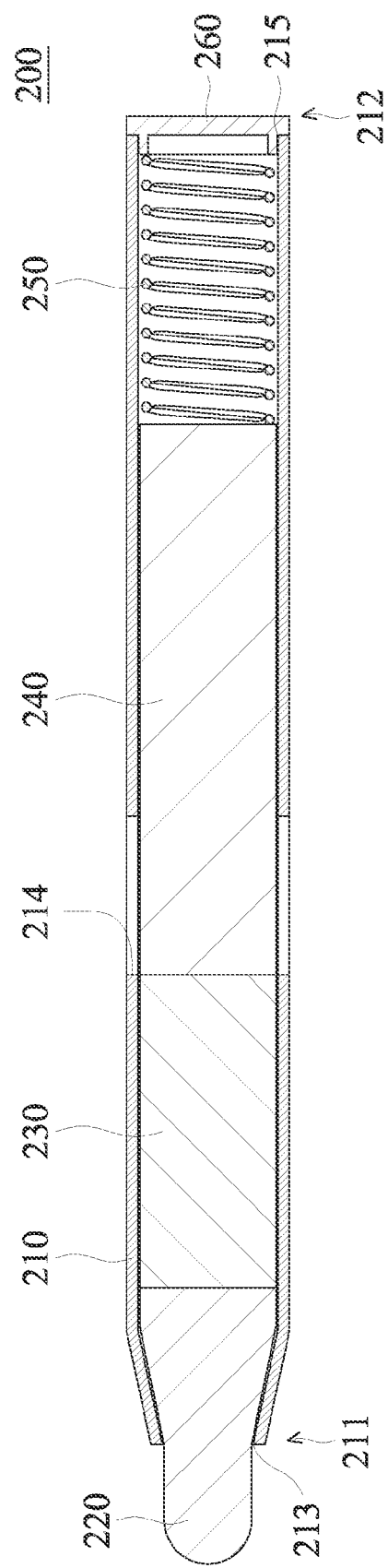
FIG. 3C is a cross-sectional view taken along the line x-x in FIG. 3A.

Referring to FIGS. 3A-3C, the stylus 200 comprises a housing 210, a contacting member 220, a reflecting member 230, a rod 240, an elastic member 250, and a plug 260. The housing 210 comprises a first end 211, a second end 212, a first opening 213, a second opening 214, and a third opening 215. The first end 211 is opposite to the second end 212. The first opening 213 is formed at the first end 211, the third opening 215 is formed at the second end 212, and the second opening 214 is formed between the first end 211 and the second end 212. After the contacting member 220, the reflecting member 230, the rod 240, and the elastic member 250 are disposed into the housing 210 through the third opening 215, the third opening 215 can be sealed by the plug 260. Thus, those members can be stably received in the housing 210.

As shown in FIG. 3C, the contacting member 220 is disposed at the first end 211 and protrudes from the first opening 213. The reflecting member 230 connects the contacting member 220 with the rod 240 and is disposed therebetween. The elastic member 250 connects the plug 260 with the rod 240 and is disposed therebetween. In this embodiment, the elastic member 250 can be a compression spring. It should be understood that, as shown in FIGS. 3A and 3C, when the stylus 200 does not receive any external force and is situated in its original state, the reflecting member 230 is situated between the first opening 213 and the second opening 214 and covered by the housing 210. Therefore, the sensing devices 100 in FIG. 1 cannot receive any light signals reflected by the reflecting member 230 when the stylus 200 is not used.

As shown in FIG. 3B, when the contacting member 220 of the stylus 200 presses the display surface d of the display device D by an external force from the user, the contacting member 220 moves from the first end 211 toward the second end 212, as the first direction A1 indicates in FIG. 3B. Meanwhile, the reflecting member 230 is pushed by the contacting member 220 along the first direction A1 and exposed to the second opening 214 (FIG. 3B). Thus, the sensing devices 100 can receive the light signal reflected by the reflecting member 230 and detect the position of the stylus 200. Subsequently, the sensing devices 100 can transmit the position signal to the display device D (the smart TV, the main body of the computer, or the projector). When the contacting member 220 is separated from the display surface d, the elastic member 250 provides a recovery elastic force to move the rod 240, the reflecting member 230, and the contacting member 220 from the second end 212 to the first end 211, such that the stylus 200 returns to the original state (FIG. 3A).

In some embodiments, the rod 240 can be omitted from the touch control system, and the opposite ends of the elastic member 250 can directly contact between the reflecting member 230 and the plug 260. In some embodiments, the second opening 214 can be covered by a transparent material to achieve an integrated appearance for the stylus 200. Furthermore, in some embodiments, the plug 260 and the housing 210 can be integrally formed in one piece.

Figure 4A:
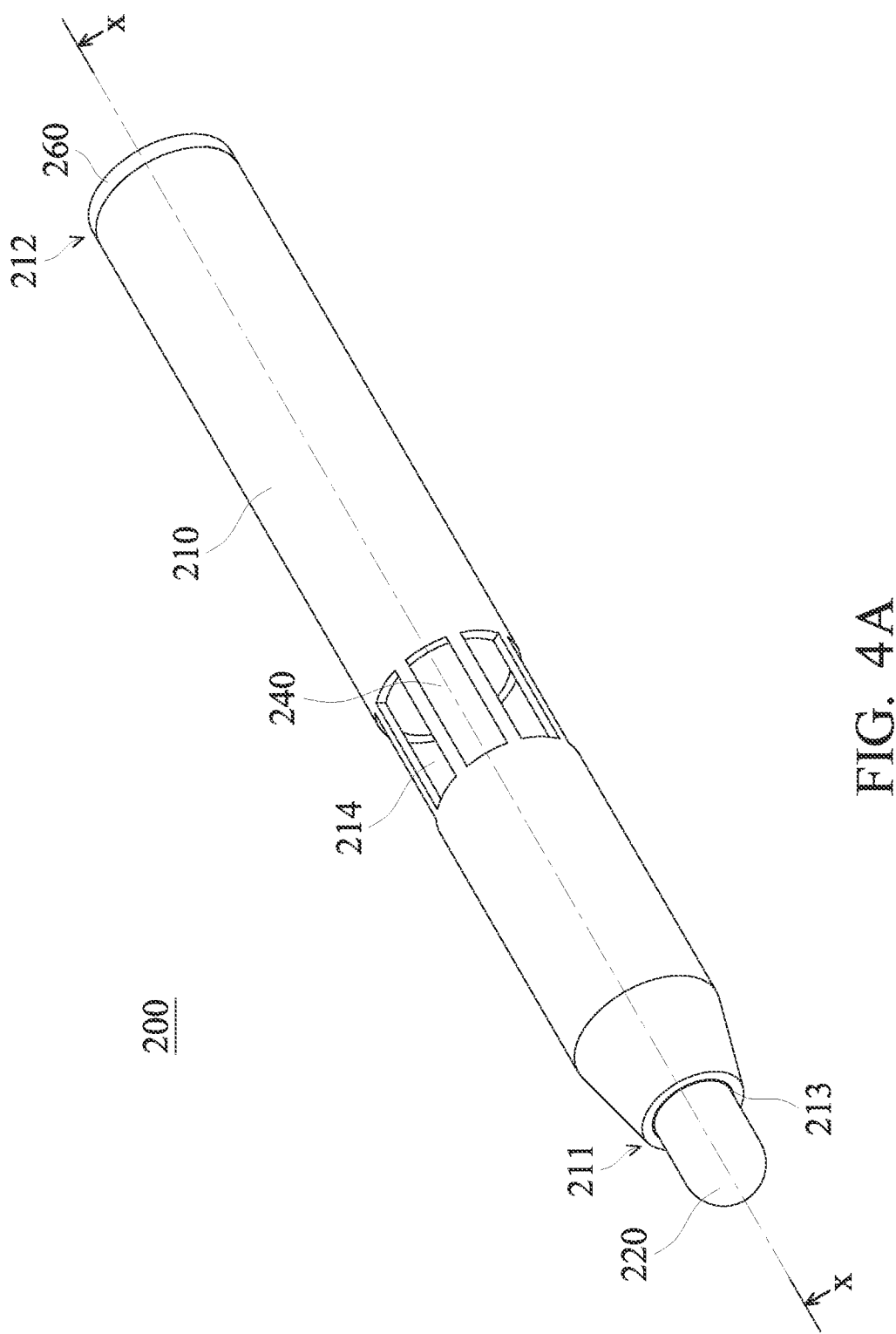
FIG. 4A is a schematic diagram of a stylus according to another embodiment of the invention.
Figure 4B:
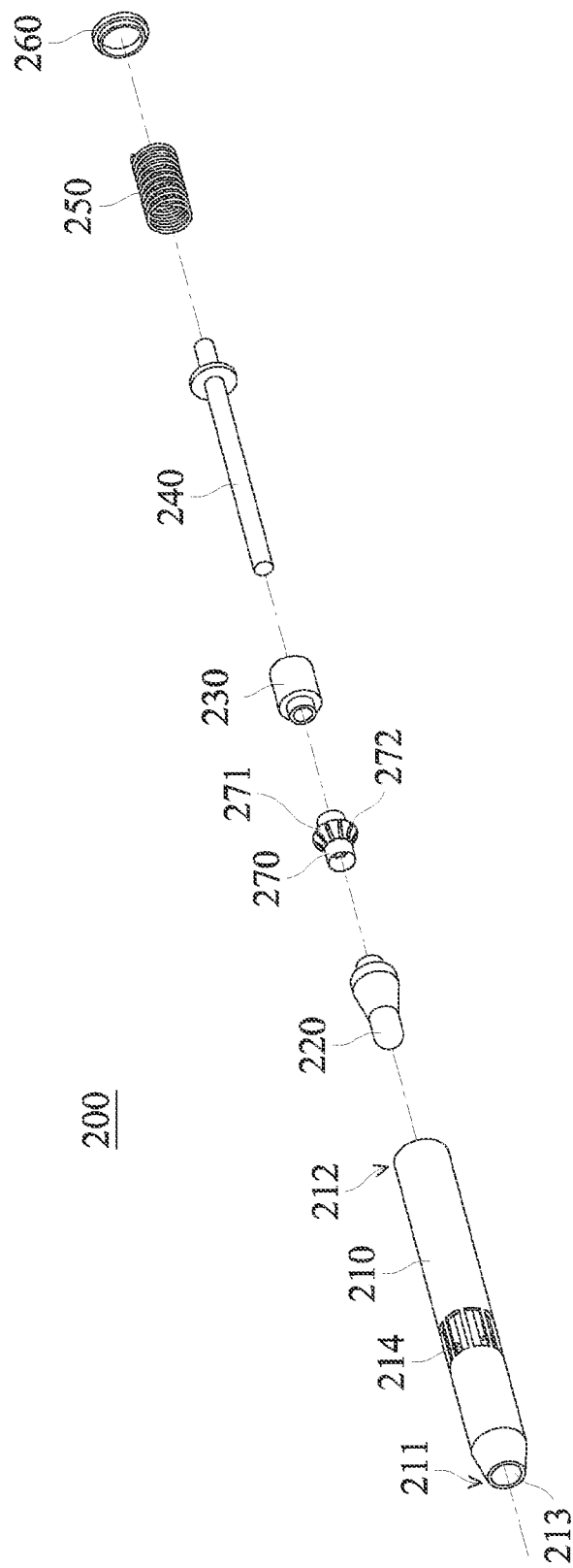
FIG. 4B is an exploded diagram of the stylus in FIG. 4A.
Figure 4C:
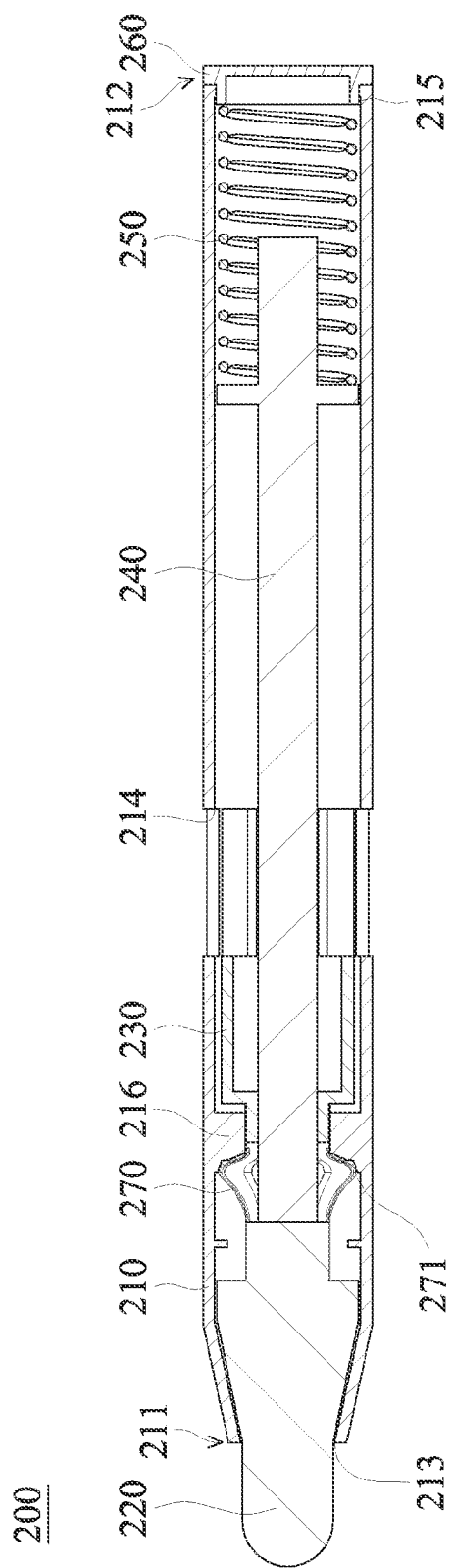
FIG. 4C is a cross-sectional view taken along the line x-x in FIG. 4A.

FIG. 4A is a schematic diagram of a stylus according to another embodiment of the invention. FIG. 4B is an exploded diagram of the stylus 200 in FIG. 4A, and FIG. 4C is a cross-sectional view taken along the line x-x in FIG. 4A. In this embodiment, a protrusion 216 (FIG. 4C) is formed on the inner wall of the housing 210, the rod 240 connects to the contacting member 220, and the stylus 200 further comprises a flexible member 270 such as a flexible rubber, plastic, or metal sheet. The flexible member 270 connects the contacting member 220 with the reflecting member 230 and is disposed therebetween, wherein the flexible member 270 and the reflecting member 230 surround the rod 240. Specifically, the flexible member 270 comprises a plurality of wrinkle portions 271. A plurality of holes 272 are formed between the adjacent wrinkle portions 271.

Figure 4D:
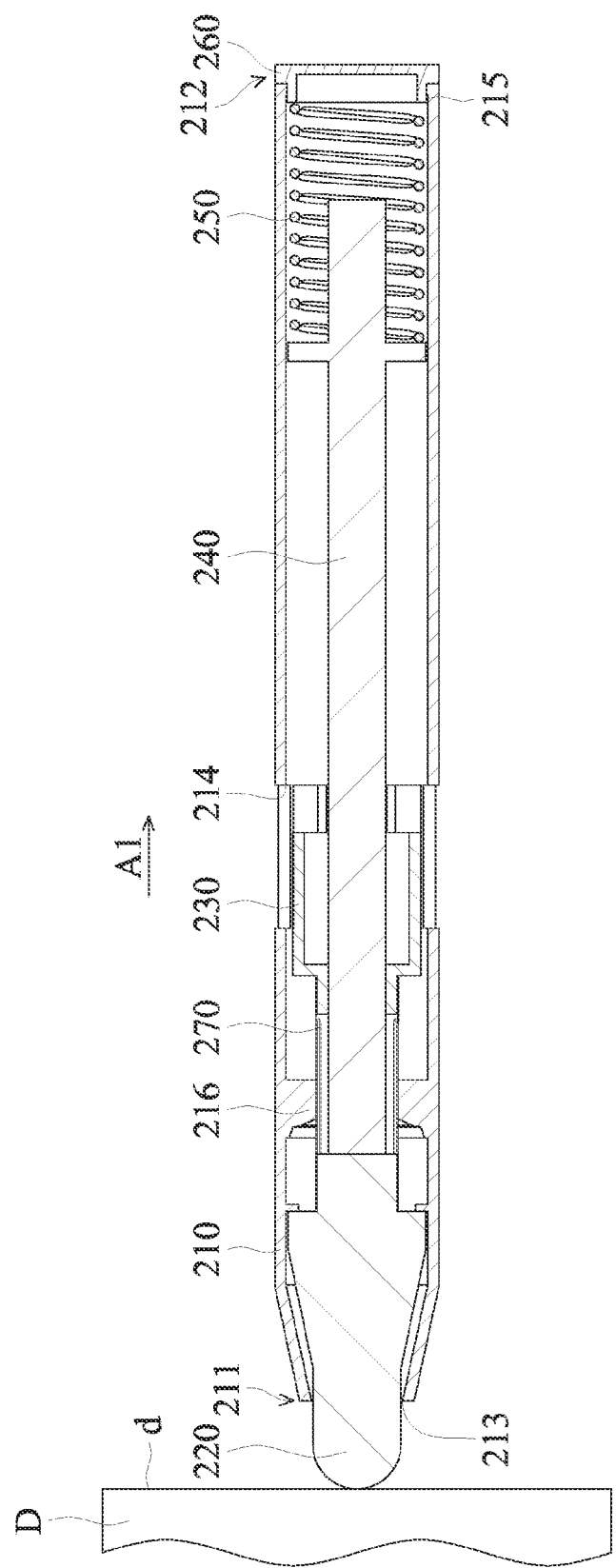
FIG. 4D is a schematic diagram of the stylus in FIG. 4A contacting a display surface according to an embodiment of the invention.

As shown in FIG. 4C, when the stylus 200 is situated in the original state, the reflecting member 230 and the flexible member 270 are disposed between the first opening 213 and the second opening 214, and the wrinkle portions 271 of the flexible member 270 abut the protrusion 216. Referring to FIG. 4D, when the contacting member 220 of the stylus 200 presses the display surface d of the display device D by an external force from the user, the contacting member 220 moves from the first end 211 toward the second end 212 along the first direction A1. Meanwhile, the wrinkle portions 271 of the flexible member 270 slide along the surface of the protrusion 216, and the protrusion 216 presses and flattens the wrinkle portions 271. Thus, the rightward displacement of the reflecting member 230 exceeds that of the contacting member 220, and the reflecting member 230 can be exposed to the second opening 214 by a small displacement of the contacting member 220, so as to facilitate convenient usage of the stylus 200.

The shapes and dimensions of the wrinkle portions 271 can be adjusted as required. As shown in FIGS. 5A and 5B, the wrinkle portions 271 may have a curved shape as seen from a cross section, according to another embodiment of the invention. In this embodiment, the curved shape of the wrinkle portion 271 forms a semicircle having a radius r. When the contacting member 220 moves a distance r along the first direction A1, the reflecting member 230 moves a distance $(\pi-1)r$ along the first direction A1 (as shown in FIG. 5B). Thus, the stylus 200 and the touch control system are easy to use.

Figure 6A:
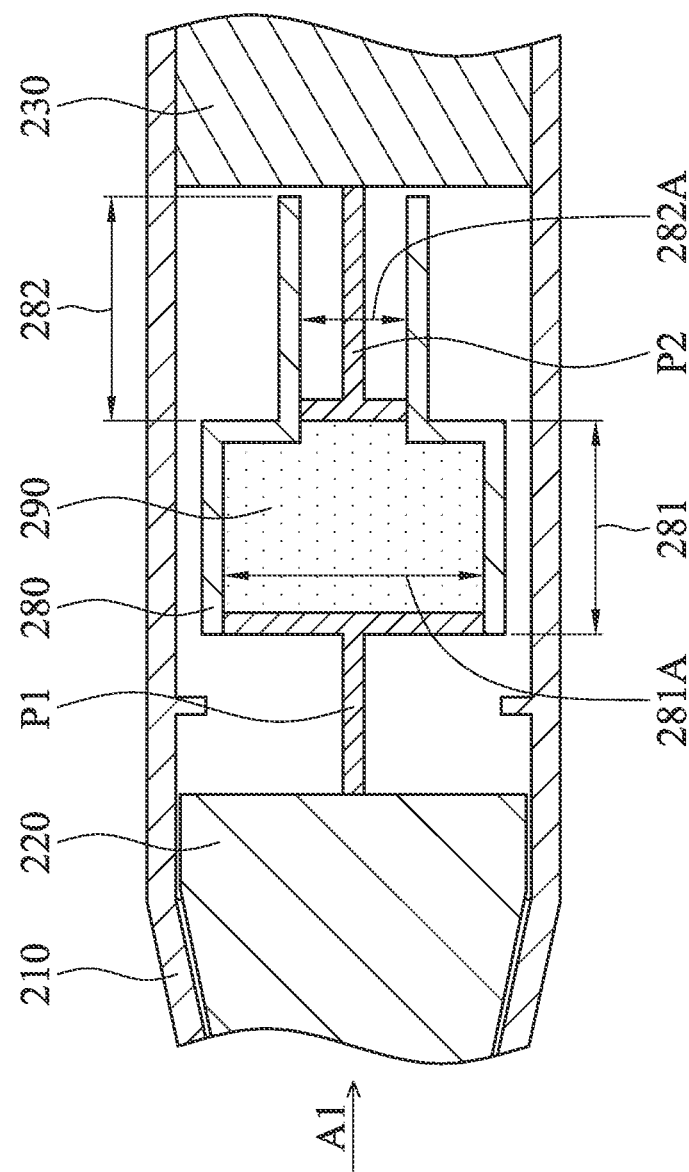
FIG. 6A is a partial cross-sectional view of a stylus according to another embodiment of the invention.
Figure 6B:
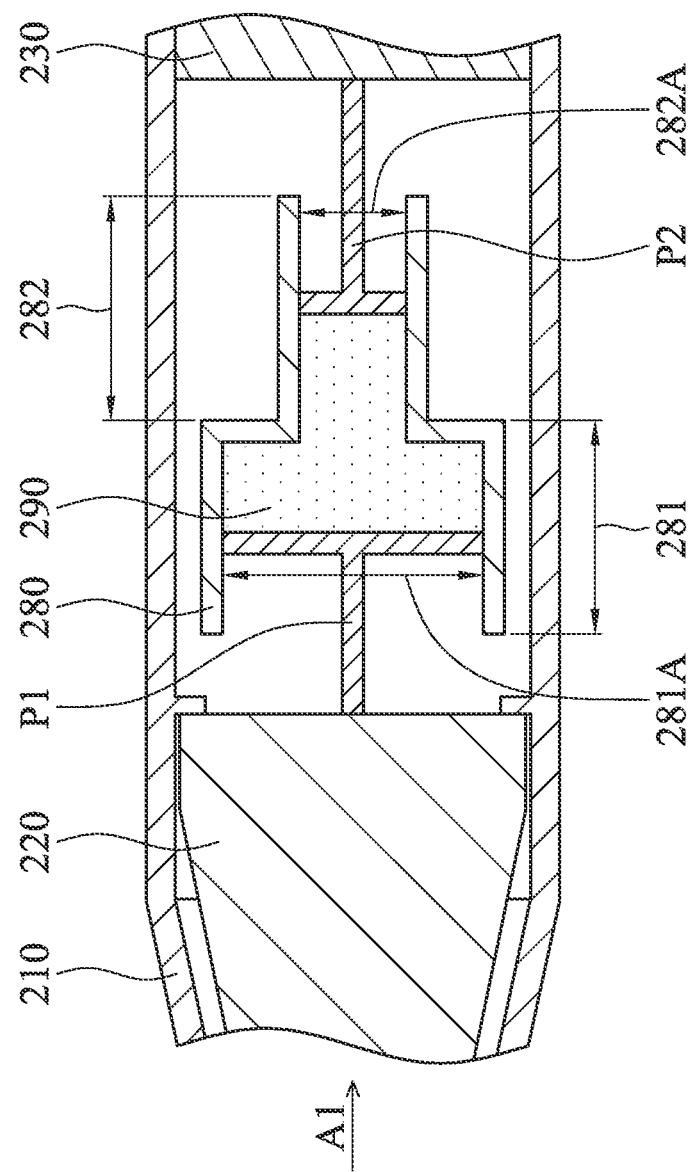
FIG. 6B is a schematic diagram of a contacting member of the stylus in FIG. 6A which moves along a first direction.

Referring to FIGS. 6A and 6B, a stylus 200 of another embodiment comprises a receiving member 280, a fluid 290, a first piston P1, and a second piston P2. The first piston P1 connects to the contacting member 220, and the second piston P2 connects to the reflecting member 230. The receiving member 280 is disposed in the housing 210 and situated between the contacting member 220 and the reflecting member 230. The fluid 290 is disposed in the receiving member 280. As shown in FIG. 6B, when the contacting member 220 moves along the first direction A1, the first piston P1 pushes the fluid 290 along the first direction A1, and the fluid 290 pushes the second piston P2 and the reflecting member 230, such that the reflecting member 230 moves along the first direction A1. It should be noted that the receiving member 280 comprises a first portion 281 and a second portion 282. The first portion 281 is close to the contacting member 220, and the second portion 282 is close to the reflecting member 230. The cross-sectional area 281A of the first portion 281 exceeds the cross-sectional area 282A of the second portion 282. In this embodiment, the fluid 290 is an incompressible fluid.

Figure 7:
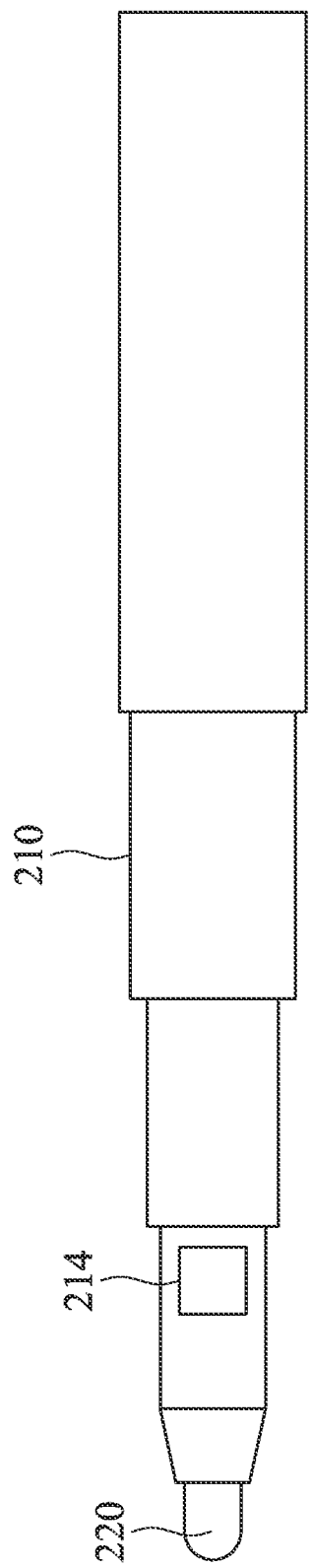
FIG. 7 is a schematic diagram of a stylus according to another embodiment of the invention.

Referring to FIG. 7, the housing 210 of the stylus 200 may have a telescopic structure. Therefore, the stylus 200 can be retracted for convenient usage.

In summary, a touch control system is provided in the invention. A flat display device or a flat surface can be used as a touch screen by simply applying the touch control system thereto, thus facilitating easy and intuitive usage for the users.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A touch control system connected to a display surface, the touch control system comprising:
   at least two sensing devices; and
   a stylus, comprising:
   a housing, including a first end and a second end opposite to the first end;
   a first opening, formed at the first end;
   a second opening, formed between the first end and the second end;
   a contacting member, protruding from the first opening; and
   a reflecting member, disposed in the housing, situated between the first opening and the second opening, and connected to the contacting member, wherein when the contacting member contacts the display surface and moves along a direction from the first opening toward the second opening, the reflecting member is exposed to the second opening and reflects a light signal emitted from the sensing devices.

2. The touch control system as claimed in claim 1, wherein the display surface is formed on a display device, and the sensing devices connect to the display device.

3. The touch control system as claimed in claim 1, wherein the sensing devices electrically connect to a computer.

4. The touch control system as claimed in claim 1, wherein the sensing devices are clamped at the corners of the display surface.

5. The touch control system as claimed in claim 1, wherein the stylus further comprises an elastic member disposed between the second end of the housing and the reflecting member.

6. The touch control system as claimed in claim 5, wherein the stylus further comprises a rod disposed between the reflecting member and the elastic member.

7. The touch control system as claimed in claim 1, wherein the stylus further comprises a rod connected to the contacting member and disposed between the contacting member and the elastic member, and the reflecting member surrounds the rod.

8. The touch control system as claimed in claim 1, wherein the stylus further comprises a flexible member disposed between the contacting member and the reflecting member, the flexible member comprises a wrinkle portion and the housing comprises a protrusion, wherein when the contacting member contacts the display surface and moves along a direction from the first opening toward the second opening, the protrusion flattens the wrinkle portion along a direction toward the interior of the housing.

\* \* \* \* \*